United States Patent
Alam et al.

(10) Patent No.: US 12,019,553 B2
(45) Date of Patent: Jun. 25, 2024

(54) SYSTEM, APPARATUS AND METHOD FOR PREFETCHING PHYSICAL PAGES IN A PROCESSOR

(71) Applicant: Intel Corporation, Santa Clara, CA (US)

(72) Inventors: Hanna Alam, Jish (IL); Joseph Nuzman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 587 days.

(21) Appl. No.: 17/130,696

(22) Filed: Dec. 22, 2020

(65) Prior Publication Data
US 2022/0197808 A1 Jun. 23, 2022

(51) Int. Cl.
*G06F 12/0862* (2016.01)
*G06F 12/084* (2016.01)

(52) U.S. Cl.
CPC ........ *G06F 12/0862* (2013.01); *G06F 12/084* (2013.01); *G06F 2212/6028* (2013.01)

(58) Field of Classification Search
CPC ......... G06F 12/0862; G06F 2212/6028; G06F 12/084; G06F 12/0897; G06F 9/3802; G06F 15/7807
USPC .................................................. 711/137, 118
See application file for complete search history.

(56) References Cited

U.S. PATENT DOCUMENTS

| | | | |
|---|---|---|---|
| 5,822,790 A | 10/1998 | Mehrotra | |
| 2007/0101100 A1* | 5/2007 | Al Sukhni | G06F 9/3808 |
| | | | 712/E9.058 |
| 2015/0378919 A1* | 12/2015 | Anantaraman | G06F 12/0897 |
| | | | 711/122 |
| 2017/0286304 A1 | 10/2017 | Peled et al. | |
| 2019/0138451 A1 | 5/2019 | Alam et al. | |
| 2020/0104259 A1 | 4/2020 | Wang et al. | |
| 2021/0303471 A1* | 9/2021 | Meier | G06F 9/383 |

OTHER PUBLICATIONS

European Patent Office, Extended European Search Report dated Apr. 5, 2022 in European Patent Application No. 21198548.6 (8 pages).
Sair et al., "A Decoupled Predictor-Directed Stream Prefetching Architecture", IEEE Transactions on Computers, vol. 52, Issue 3, Mar. 2003, pp. 260-276, XP011095846.
U.S. Appl. No. 17/033,282, filed Sep. 25, 2020, entitled "Methods and Apparatus to Dynamically Enable and/or Disable Prefetchers," by Hanna Alam, et al.

* cited by examiner

*Primary Examiner* — David Yi
*Assistant Examiner* — Zubair Ahmed
(74) *Attorney, Agent, or Firm* — Trop, Pruner & Hu, P.C.

(57) ABSTRACT

In one embodiment, a processor includes: one or more execution circuits to execute instructions; a stream prediction circuit coupled to the one or more execution circuits, the stream prediction circuit to receive demand requests for information and, based at least in part on the demand requests, generate a page prefetch hint for a first page; and a prefetcher circuit to generate first prefetch requests each for a cache line, the stream prediction circuit decoupled from the prefetcher circuit. Other embodiments are described and claimed.

20 Claims, 10 Drawing Sheets

SYSTEM, APPARATUS AND METHOD FOR PREFETCHING PHYSICAL PAGES IN A PROCESSOR

TECHNICAL FIELD

Embodiments relate to processor circuitry, and more specifically to prefetch circuitry for prefetching information from a memory hierarchy.

BACKGROUND

In a processor, a core typically includes execution circuitry to perform instructions using data. In some scenarios this data may be obtained from a memory hierarchy. When data for a particular instruction is not available, it is requested from the memory hierarchy. In this situation when the data is not available, a so-called demand request is issued to obtain the data. In addition to such demand requests, modern processors typically include prefetch circuitry to obtain data in advance of when it may be used by the execution circuitry. While such prefetching can reduce latency and improve performance, conventional prefetching implementations can suffer from bandwidth and capacity issues.

DETAILED DESCRIPTION

Figure 1:
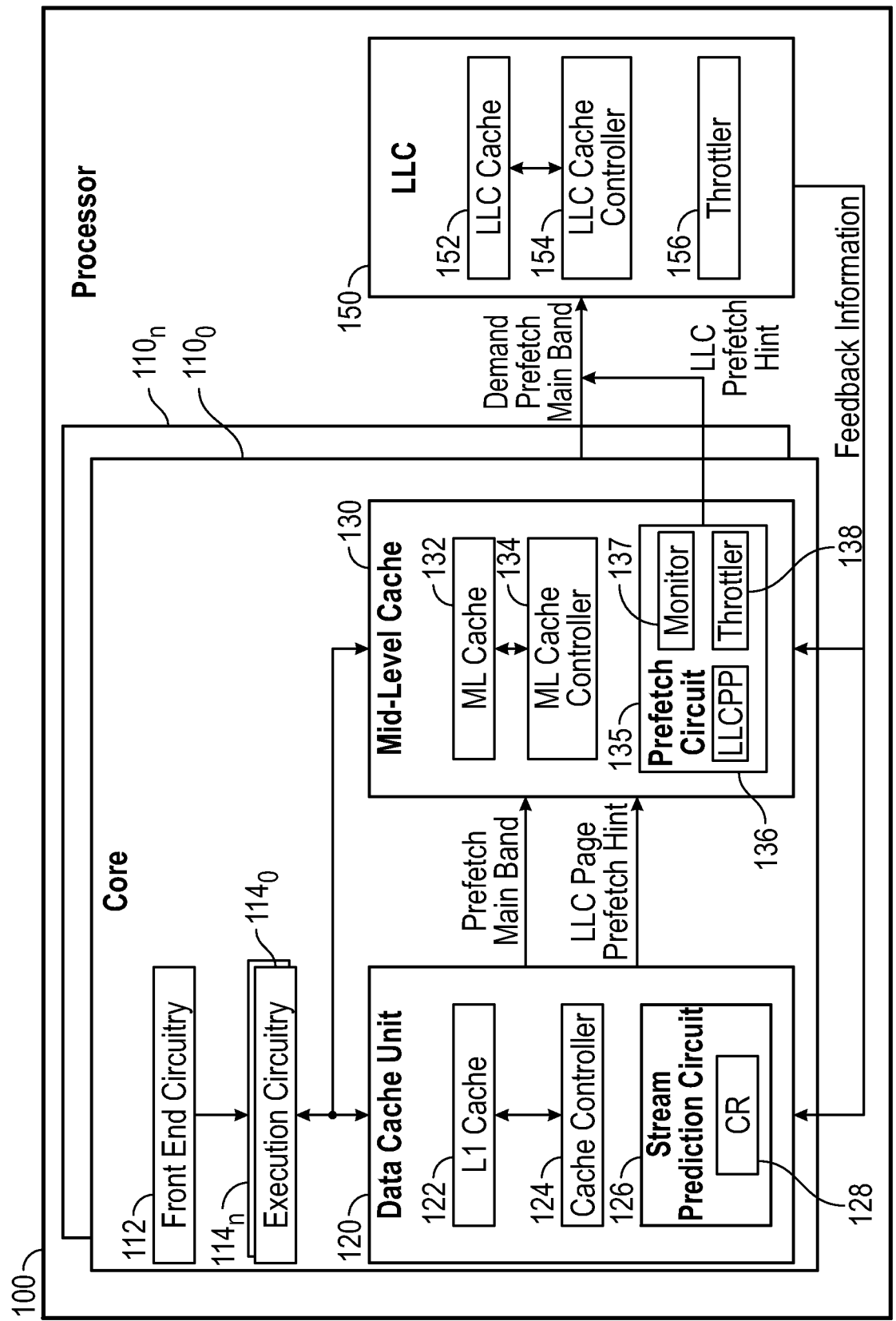
FIG. 1 is a block diagram of a processor in accordance with an embodiment.

In various embodiments, a processor is provided with a page prefetch mechanism that can be used to allow a data requester such as a core to consume more bandwidth (e.g., of an on-die interconnect and/or an attached memory), when available. This page prefetch mechanism may operate to enable early detection of streams within physical pages and prefetching an entire physical page (or large portion thereof) to a cache hierarchy (e.g., a shared cache memory such as a last level cache (LLC)). And this page prefetch mechanism may operate in a demand-stream agnostic manner. Stated another way, this page prefetch mechanism may be implemented in a decoupled manner from conventional prefetch mechanisms of the processor so that it is unimpeded by runtime constraints in these mechanisms.

In particular embodiments this page prefetch mechanism may be implemented in hardware circuitry that is separate and decoupled from other prefetch circuitry of a processor. In this way, a core or other requester can increase consumed bandwidth for streaming scenarios without having too much dependency on the demand stream and the core's internal queues and restrictions. As such, embodiments may increase the core-consumed bandwidth for cases where the processor can sustain high bandwidth and the core is limited due to internal restrictions.

In one embodiment, a page prefetcher circuit may be implemented in multiple parts. The first part (which may be present in a memory execution unit (MEU) cluster of a core) handles stream prediction, while a second part (which may be present in a mid-level cache (MLC) cluster) is responsible for monitoring and issuing the page prefetches. In some embodiments, there may be throttling mechanisms to throttle this page prefetcher in certain scenarios.

As mentioned above, in an embodiment a data cache unit (DCU) or other core-internal cache circuitry may include a stream detector to use a next page prefetcher (NPP) algorithm to detect a stream. Of course other stream detection mechanisms can be used in other embodiments. The stream detector monitors and checks for a given number of consecutive cache line accesses in a particular portion of a physical page of memory (e.g., near the end of a page). When this threshold number of consecutive cache line accesses is attained, a page prefetch hint is generated for a physical page different from a current page being accessed by demand requests. As one example, this physically distinct page may be at a stride of two physical pages distance to a current page, and thus may be for a beginning of the page at an offset of, e.g., 8K, from a triggering address. Note that a page stride value (in this instance 2) may be configurable, e.g., based on workload, and can be stored in a configuration register.

In an embodiment, the page prefetch hint dispatches on a load port, translates through an address translation mechanism (such as a translation lookaside buffer (TLB)) and can perform a page walk in case of a TLB miss. Once dispatched to a cache memory of the DCU, it looks up the DCU and may be dropped in the case of DCU hit.

In an embodiment, page prefetch hints that reach the MLC will allocate a page prefetch detector, if there is no hit in a cache memory of the MLC. In an embodiment, this page prefetch detector (which may include multiple separate detectors, also referred to herein as LLC page prefetch (LLCPP) detectors)), may hold the physical page address of the page and a next prefetchable offset for that page. Once allocated, the LLCPP detector may utilize any unused interconnect slot to issue an LLC page prefetch independent of a demand stream, which may be stalled for various reasons. In an embodiment, the priority of the LLCPP requests towards the interconnect may be lower than demand requests. LLC page prefetch requests may be selected via round robin between the LLCPP detectors if multiple detectors are valid. The detector may also have a direction of the stream based on the offset of the allocating page prefetch hint. Upon evicting a LLCPP detector, another LLC prefetch scheme may be enabled if the next offset to prefetch is less than a predefined threshold.

In some embodiments, processor stress indications may stall this page prefetcher and stop the generation of new prefetches. These stress indications may include levels of bandwidth and so forth. Similarly, the page prefetcher may be stalled based on certain processor metrics. For example, the page prefetcher may be stalled if an average number of demand accesses per physical page is less than a given threshold, which may be a configurable value stored in a configuration register.

Referring now to FIG. 1, shown is a block diagram of a processor in accordance with an embodiment. More specifically as shown in FIG. 1, processor 100 may be any type of processor, ranging from a relatively low power processor having one or a few cores to a larger higher power processor or system on chip (SoC), among others.

In the embodiment of FIG. 1, processor 100 is shown with a plurality of cores $110_0$-$110_n$. In different implementations, cores 110 may be homogeneous or heterogeneous cores. Some details of a representative core $110_0$ are shown. Specifically as shown, core $110_0$ includes front end circuitry 112, which may be configured to obtain and decode instructions, as well as to obtain data for use in execution of such instructions. As illustrated, front end circuitry 112 couples to one or more execution circuits $114_0$-$114_n$. In different embodiments, execution circuits 114 may take the form of arithmetic logic units (ALUs) such as integer and floating point ALUs including scalar and/or vector ALUs, fixed function units or other execution circuitry.

As further illustrated, execution circuits 114 couple to various levels of a cache hierarchy. In the embodiment shown, core $110_0$ includes a data cache unit (DCU) 120 and a mid-level cache (MLC) 130. In the embodiment shown, DCU 120 includes a level one (L1) cache 122 and a cache controller 124, which may control the writing and reading of data within L1 cache 122, as well as cache control operations, including cache coherency operations, evictions, insertions, updates and so forth. DCU 120 also includes a stream prediction circuit 126. In embodiments herein, stream prediction circuit 126 may be configured to identify a stream of accesses and generate a prediction, e.g., in the form of a last level cache (LLC) page prefetch hint, that can be provided to further levels of the cache hierarchy. While stream prediction circuit 126 may be configured to detect accesses that are for streams of information such as media content (e.g., audio, video or so forth), understand that stream accesses also may include other information types such as add memory copy operations (copying one buffer to another), large array sorting, or accessing any large structure with consecutive accesses.

Note that in the embodiment herein, stream prediction circuit 126 is separate from cache controller 124 and prefetch operations performed within the cache controller. In this way, these page prefetch operations may proceed independently from other prefetch operations and avoid back pressure or other constraints. Note as further shown, while prefetch requests generated in cache controller 124 may be communicated to MLC 130 via a prefetch main band, LLC page prefetch hints generated in stream prediction circuit 126 may be sent via a separate path to MLC 130. As a result, these prefetch hints are sent in a fire and forget manner.

As further illustrated in FIG. 1, one or more configuration registers 128 may be present to store configurable parameters for operation of stream prediction circuit 126. In an embodiment configuration registers 128 may be present within stream prediction circuit 126. Of course they may be located in other locations in other embodiments. In one embodiment, configuration registers 128 may store information for a page stride value, which may be a given number of pages ahead (or behind) of a current page at which a LLC page prefetch is to occur. In addition, a configurable number of consecutive accesses that may trigger such page prefetch also may be stored as another configuration parameter. Of course other configuration parameters may be used in other embodiments.

With reference now to MLC 130, this cache may be larger and can be configured to be inclusive or non-inclusive with respect to data cache unit 120. MLC 130 includes a level two (L2) cache 132 and a cache controller 124, which may control the writing and reading of data within cache 132. As illustrated, a prefetch circuit 135 may be configured to perform prefetch operations for MLC 130. In addition to typical MLC prefetch activity, note the presence of a LLC prefetch detector 136. In embodiments herein, prefetch detector 136 may be separate from additional circuitry of prefetch circuit 135 so that it is not affected by main band prefetch operations. Nor is it subject to capacity issues with respect to internal queues or other structures.

As will be described herein, prefetch detector 136 may receive incoming LLC page prefetch hints from data cache unit 120 and generate prefetch requests for corresponding lines of a given prefetch page, which may be one or more pages ahead (or behind) of current accesses. Note that such prefetch requests, which may be generated on a per cache line basis, may be communicated as LLC prefetch hints that can be arbitrated with prefetch and demand requests as they are sent via an interconnect such as an intra-die interconnect (IDI) to LLC 150.

As further illustrated, prefetch circuit 135 further may include a monitor 137 which may monitor various conditions, both within mid-level cache 130 as well as feedback information from LLC 150. Depending upon a level of activity, monitor 137 may inform a throttler 138 of a high level of prefetch and other traffic and may cause throttling of regular prefetch requests generated by prefetch circuit 135. Depending on implementation, throttler 138 also may stall LLC page prefetches from being generated within prefetch detector 136 depending on the activity level.

Still with reference to FIG. 1, LLC 150 includes a last level cache memory 152 which may be a shared cache memory and a cache controller 154, which may control the writing and reading of data within cache memory 152. As further shown, LLC 150 also includes a throttler 156, which may monitor bandwidth, capacity and so forth, and provide feedback information based at least in part on this monitoring to MLC 130 and DCU 120. This feedback information in turn may be used to trigger throttling of main path prefetching (and possibly LLC page prefetching). Although shown at this high level in the embodiment of FIG. 1, many variations and alternatives are possible.

Figure 2:
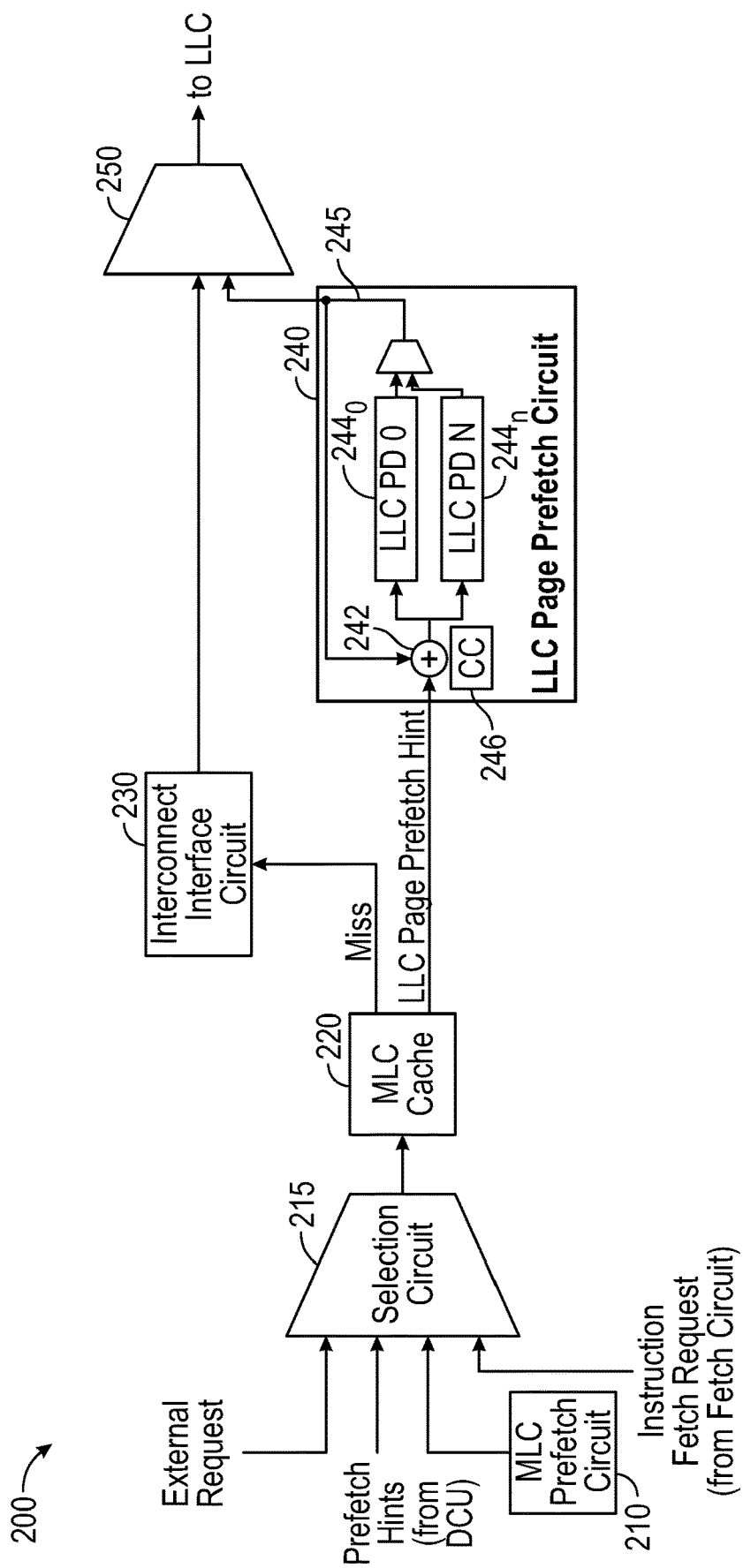
FIG. 2 is a block diagram of a mid-level cache in accordance with an embodiment.

Referring now to FIG. 2, shown is a block diagram of a mid-level cache in accordance with an embodiment. More specifically as shown in FIG. 2, MLC 200 includes MLC prefetch circuitry that includes a main band MLC prefetch circuit 210 and a separate LLC page prefetch circuit 240. As further shown, a MLC cache 220 may include the cache storage elements of MLC 200, along with cache controller circuitry (not shown for ease of illustration).

MLC prefetch circuit 210 may be configured to generate prefetches according to one or more techniques in an effort to prefetch requested data before it is subject to a demand request. As such, MLC prefetch circuit 210 outputs prefetch requests, which are provided to a selection circuit 215. In an embodiment selection circuit 215 may be implemented as a demultiplexer or other selection circuit, e.g., controlled by arbitration circuitry.

As further shown, incoming prefetch hints from a DCU, which may include conventional prefetch hints as well as LLC page prefetch hints in accordance with an embodiment, also are provided to selection circuit 215. Selection circuit 215 further may receive additional requests received from one or more external requesters. In addition, selection circuit 215 may receive instruction fetch requests, which may be received from a fetch circuit such as an instruction fetch circuit, in an embodiment. Selection circuit 215 may select from these various sources and provide a request to MLC 220, which may determine whether the requested information is present within it. If not, a miss occurs and a corresponding request may be sent to an interconnect interface circuit 230. Note however that LLC page prefetch hints may instead be sent, upon a miss for the requested data within MLC 220, to LLC page prefetch circuit 240.

Still with reference to FIG. 2, a high level view of LLC page prefetch circuit 240 is shown. A control circuit 246, which in one embodiment may be implemented as a finite state machine (FSM), may control operation of LLC page prefetch circuit 240. As seen, page prefetch circuit 240 receives incoming LLC page prefetch hints. These prefetch hints may be provided to a selected one of multiple LLC page prefetch detectors $244_0$-$244_n$.

In an embodiment these hints may include a page stride value and an offset value. In an embodiment, the page stride value may indicate a number of pages of stride length at which the prefetch operation is to occur. For example, in a forward direction, a page stride value of two indicates that the prefetch is to begin at a location two pages forward of a page currently accessed. In typical system implementations with 4K page sizes, a page stride value of two thus corresponds to an 8K stride. In turn, the offset value may indicate an offset into this strided page. In some implementations the page prefetch hints may only include the page stride value and thus prefetch requests may be generated within page prefetch circuit 240 beginning at an offset of zero within the strided page.

Still with reference to FIG. 2, LLC page detectors 244 each may be configured to receive a given page prefetch hint and generate a stream of prefetches in the strided page. For example, where no offset is provided, a given LLC page detector 244 may begin making prefetch requests at an offset of zero. These prefetch requests are provided to a selection circuit 245, which may select a given request, e.g., in round robin fashion. In turn the selected prefetch request is provided to another selection circuit 250. In embodiments herein, selection circuit 250 may select between LLC page prefetch requests and main band traffic received from interconnect interface circuit 230. As such, when high levels of traffic or other blocking conditions exist and limited traffic is sent to interconnect interface circuit 230 by main band circuitry, a relatively high number of page prefetch requests may be sent to the LLC via selection circuit 250.

Still with reference to page prefetch circuit 240, the output request also is fed back to an accumulator 242, which may accumulate an offset value, such that a given LLC prefetch detector 244 may send incremented (or decremented) prefetch requests for consecutive cache lines from a strided page. Understand while shown at this high level in the embodiment of FIG. 2, many variations and alternatives are possible.

Figure 3:
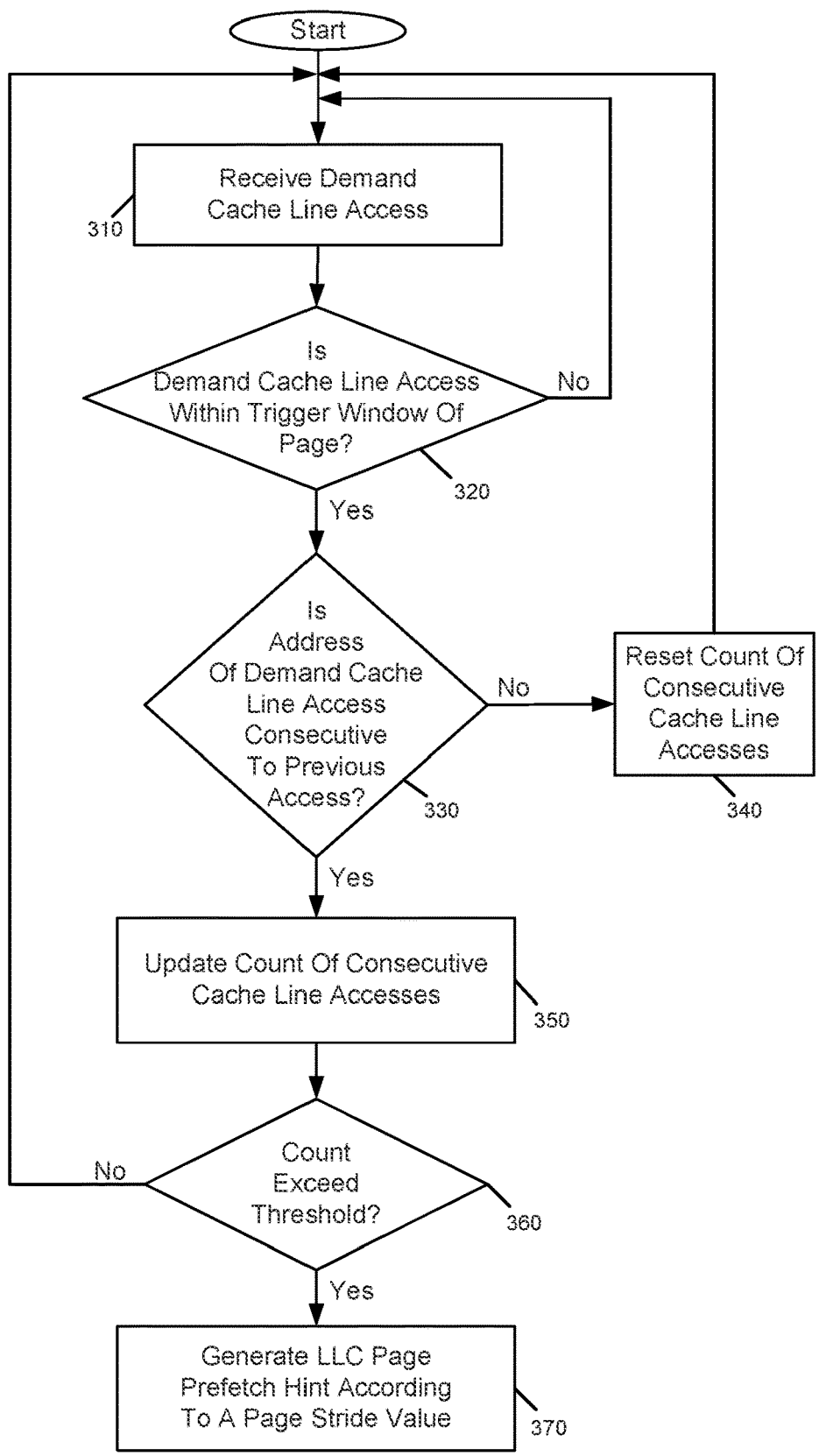
FIG. 3 is a flow diagram of a method in accordance with an embodiment.

Referring now to FIG. 3, shown is a flow diagram of a method in accordance with an embodiment. More specifically, method 300 of FIG. 3 is a method for predicting a stream access. In an embodiment, method 300 may be performed by hardware circuitry implemented within a DCU, and in some embodiments may further be implemented using firmware and/or software that executes on this hardware circuitry. In one particular example, method 300 may be performed by stream prediction circuit 126 of FIG. 1.

As illustrated, method 300 begins by receiving a demand cache line access (block 310). This demand access may be received from a requester, e.g., core circuitry, which may issue such demand access when information is being requested. Note that as a demand access, this request is for information that is needed by an actual path of execution and thus may be differentiated from speculative requests or prefetch requests.

Still with reference to FIG. 3, next it is determined whether this demand cache line access is within a trigger window of a given page (diamond 320). In an embodiment, this trigger window may be within a certain distance to a page boundary, e.g., a beginning or end of a page. Of course in other implementations a trigger window may be identified within another portion of a page, such as a midpoint of a page or so forth. In any event, if the demand access is not within this trigger window, no further operation occurs, and control passes back to block 310.

Instead if it is determined that the demand access is within this trigger window, control next passes to diamond 330 to determine whether the address of the demand access is consecutive to a previous access. In an embodiment, this consecutive address may correspond to a next cache line to the previous access. If this demand access is not for a consecutive location, control passes to block 340 where a count of consecutive cache line accesses may be reset. In an embodiment, control then passes back to block 310.

Still referring to FIG. 3, instead if it is determined that this demand access is for a consecutive location, control passes to block 350 where the count of consecutive cache line accesses may be updated, e.g., incremented by one. Next it is determined whether this count exceeds a threshold (diamond 360). Although embodiments are not limited in this regard, this threshold level may be set at a configurable number that in an embodiment may be between, e.g., 3 and 5. When it is determined that this count exceeds the threshold level, control passes to block 370 where a LLC page prefetch may be generated. Further this generated page prefetch hint may have a page stride value corresponding to a given number of stride pages. Although embodiments are not limited in this regard this page stride value, which may be a configurable value, may be set between, e.g., 2 and 3 in an embodiment. As such, this page prefetch hint is issued to start prefetching the cache lines of a page that is the strided value of pages ahead (or behind) of the current page (in a linear or virtual address space) that is being accessed by demand requests.

In this way, information that is likely to be needed in the future, such as more streaming data, can be efficiently obtained and available for ready use by a requester such as a core. Furthermore, rather than sending multiple prefetch hints each for a single cache line, in embodiments herein this LLC page prefetch is a single prefetch hint that may be used by a LLC page mechanism such as an LLC page detector to in turn generate multiple individual cache line prefetches.

Understand while shown at this high level in the embodiment of FIG. 3, many variations and alternatives are possible.

Figure 4:
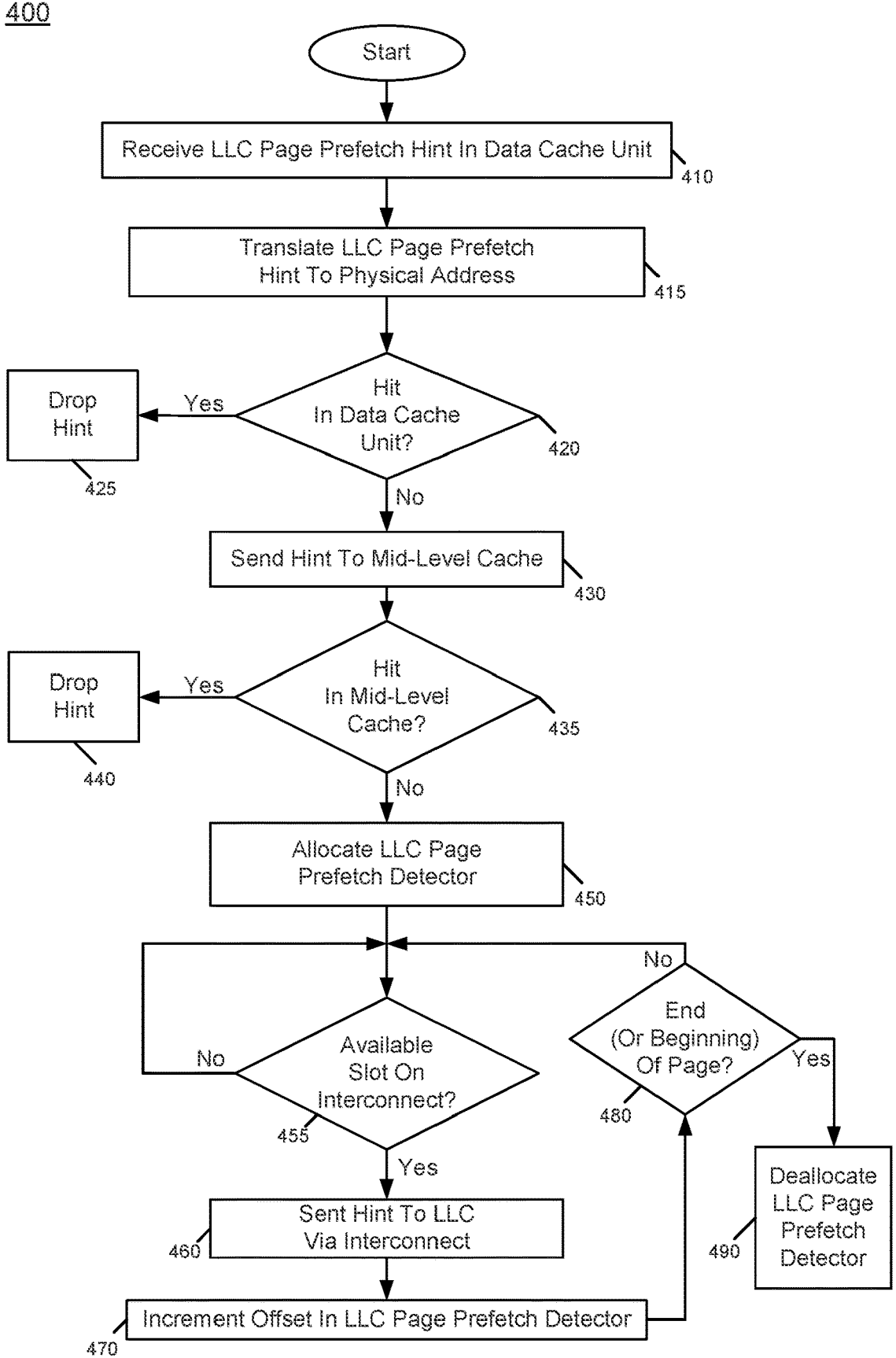
FIG. 4 is a flow diagram of a method in accordance with another embodiment.

Referring now to FIG. 4, shown is a flow diagram of a method in accordance with another embodiment. More specifically, method 400 of FIG. 4 is a method for performing page prefetching. In an embodiment, method 400 may be performed by hardware circuitry implemented within a DCU and MLC, and in some embodiments may further be implemented using firmware and/or software that executes on this hardware circuitry.

As illustrated, method 400 begins by receiving an LLC page prefetch hint in a DCU (block 410). Understand that in embodiments herein, this page prefetch hint itself may be generated within circuitry of the DCU, such as a stream prediction circuit. Next at block 415 this page prefetch hint may be translated to provide a physical address, as in embodiments the page prefetch hint may be generated with a linear or virtual address. Next it is determined at diamond 420 whether the hint hits within the DCU. In an embodiment, a cache controller may determine based at least in part on the virtual address whether data of the requested page prefetch hint is present in the DCU. If so, at block 425 the hint is dropped.

Otherwise if the page prefetch misses in the DCU, control passes to block 430 where it is sent to an MLC. It is determined at diamond 435 whether the hint hits within the MLC. If so, at block 440 the hint is dropped. Otherwise on a miss, at block 450 a LLC page prefetch detector may be allocated, e.g., within page prefetch circuitry of the MLC. Note that such page prefetch detector may be a separate path through the prefetch circuitry such that it is not impacted by back pressure, capacity issues or so forth of a main prefetch path. By allocating this page prefetch detector, it may start generating individual cache line prefetches for consecutive cache lines within the subject strided page.

Still referring to FIG. 4, next it is determined at diamond 455 whether there is an available slot on an interconnect that couples the MLC to the LLC, e.g., an IDI. Note that this determination may be implemented in interface circuitry within the MLC or more generally in the core. When an available slot is present, control passes to block 460 where this hint, which is a prefetch hint for a given cache line within a strided page, is sent to the LLC via the interconnect. Then at block 470, operation of the page prefetch detector is illustrated where this offset may be incremented to prepare for a next prefetch hint. Control passes to diamond 480 to determine whether the prefetches have reached an end (or beginning) of a strided page. If not, control passes back to diamond 455. Otherwise at this determination point, all lines of a given stride page have been requested for prefetch, and as such control passes to block 490 where the LLC page prefetch detector may be de-allocated. Understand while shown at this high level in the embodiment of FIG. 4, many variations and alternatives are possible.

Figure 5A:
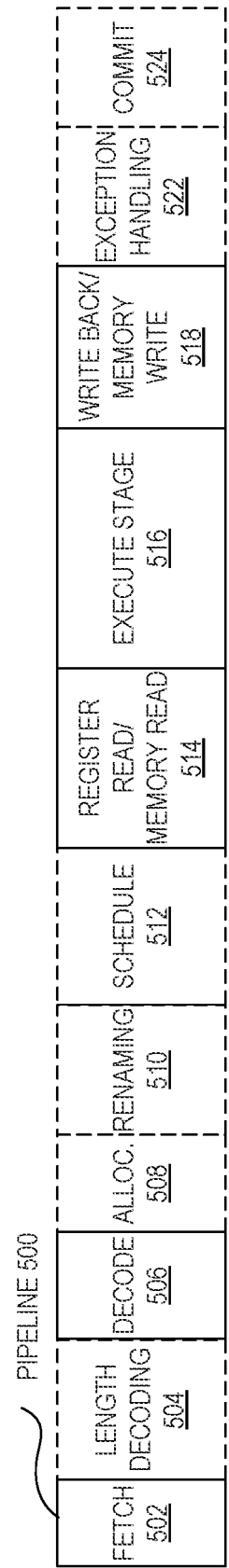
FIG. 5A is a block diagram illustrating both an exemplary in-order pipeline and an exemplary register renaming, out-of-order issue/execution pipeline according to embodiments of the invention.
Figure 5B:
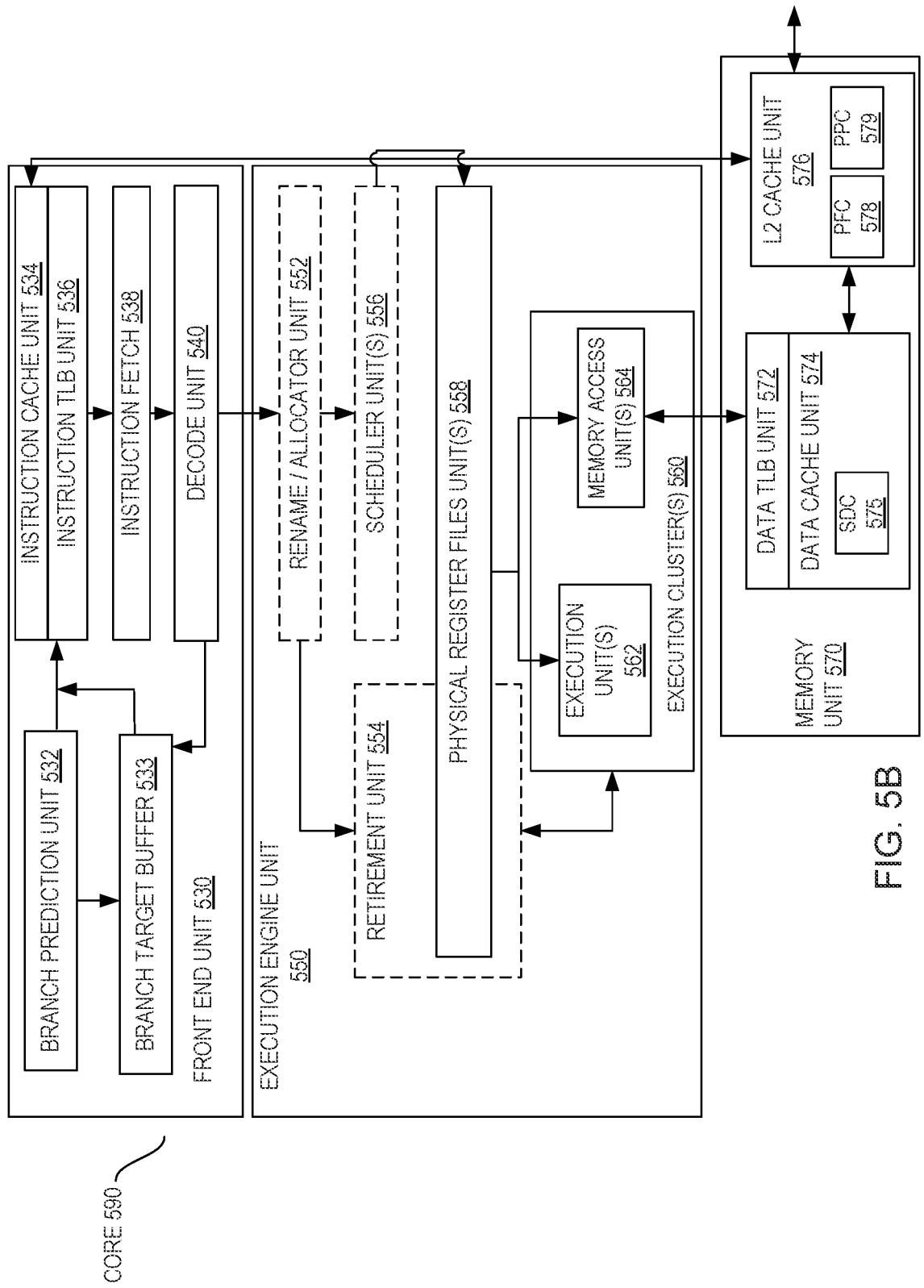
FIG. 5B is a block diagram illustrating both an exemplary embodiment of an in-order architecture core and an exemplary register renaming, out-of-order issue/execution architecture core to be included in a processor according to embodiments of the invention.

Understand that embodiments may be used in connection with many different processor architectures. FIG. 5A is a block diagram illustrating both an exemplary in-order pipeline and an exemplary register renaming, out-of-order issue/execution pipeline according to embodiments of the invention. FIG. 5B is a block diagram illustrating both an exemplary embodiment of an in-order architecture core and an exemplary register renaming, out-of-order issue/execution architecture core to be included in a processor according to embodiments of the invention. Such embodiments may include decoupled page prefetch mechanisms separate and decoupled from other prefetch circuitry of a processor as described herein. The solid lined boxes in FIGS. 5A and 5B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 5A, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. Note that as described herein, in a given embodiment a core may include multiple processing pipelines such as pipeline 500.

FIG. 5B shows processor core 590 including a front end unit 530 coupled to an execution engine unit 550, and both are coupled to a memory unit 570. The core 590 may be a reduced instruction set computing (RISC) core, a complex instruction set computing (CISC) core, a very long instruction word (VLIW) core, or a hybrid or alternative core type. As yet another option, the core 590 may be a special-purpose core, such as, for example, a network or communication core, compression engine, coprocessor core, general purpose computing graphics processing unit (GPGPU) core, graphics core, or the like.

The front end unit 530 includes a branch prediction unit 532 coupled to a branch target buffer 533 and an instruction cache unit 534, which is coupled to an instruction translation lookaside buffer (TLB) 536, which is coupled to an instruction fetch unit 538, which is coupled to a decode unit 540. The decode unit 540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 590 includes a microcode ROM or other medium that stores microcode for certain macroinstructions (e.g., in decode unit 540 or otherwise within the front end unit 530). The decode unit 540 is coupled to a rename/allocator unit 552 in the execution engine unit 550.

As further shown in FIG. 5B, the execution engine unit 550 includes the rename/allocator unit 552 coupled to a retirement unit 554 and a set of one or more scheduler unit(s) 556. The scheduler unit(s) 556 represents any number of different schedulers, including reservations stations, central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 558 comprises a vector registers unit, a write mask registers unit, and a scalar registers unit. These register units may provide architectural vector registers, vector mask registers, and general purpose registers. The physical register file(s) unit(s) 558 is overlapped by the retirement unit 554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which includes a data TLB unit 572 coupled to a data cache unit 574 coupled to a level 2 (L2) cache unit 576. In one exemplary embodiment, the memory access units 564 may include a load unit, a store address unit, and a store data unit, each of which is coupled to the data TLB unit 572 in the memory unit 570.

As shown, the data cache unit 574 may include a streaming detection circuit 575 in accordance with embodiments to detect streaming accesses as described herein. And in turn, the L2 cache unit 576 includes a prefetcher circuit 578 and a separate decoupled page prefetch circuit 579, as described herein. The instruction cache unit 534 is further coupled to the L2 cache unit 576 in the memory unit 570. The L2 cache unit 576 is coupled to one or more other levels of cache and eventually to a main memory.

By way of example, the exemplary register renaming, out-of-order issue/execution core architecture may implement the pipeline 500 as follows: 1) the instruction fetch 538 performs the fetch and length decoding stages 502 and 504; 2) the decode unit 540 performs the decode stage 506; 3) the rename/allocator unit 552 performs the allocation stage 508 and renaming stage 510; 4) the scheduler unit(s) 556 performs the schedule stage 512; 5) the physical register file(s) unit(s) 558 and the memory unit 570 perform the register read/memory read stage 514; the execution cluster 560 perform the execute stage 516; 6) the memory unit 570 and the physical register file(s) unit(s) 558 perform the write back/memory write stage 518; 7) various units may be involved in the exception handling stage 522; and 8) the retirement unit 554 and the physical register file(s) unit(s) 558 perform the commit stage 524.

The core 590 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 590 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 534/574 and a shared L2 cache unit 576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 6:
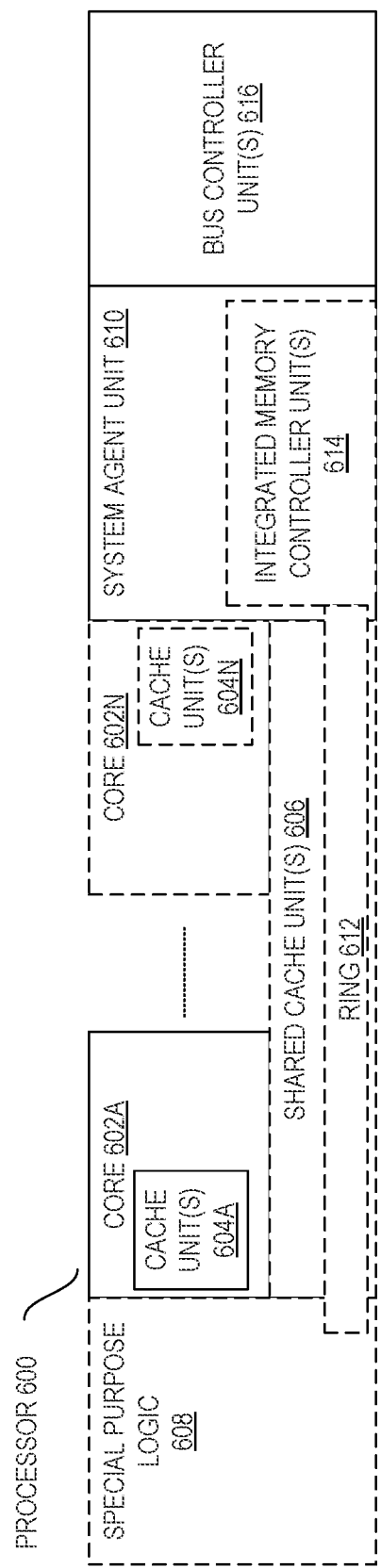
FIG. 6 is a block diagram of a processor that may have more than one core, may have an integrated memory controller, and may have integrated graphics according to embodiments of the invention.

FIG. 6 is a block diagram of a processor 600 that may have more than one core, may have an integrated memory controller, and may have integrated graphics according to embodiments of the invention. The solid lined boxes in FIG. 6 illustrate a processor 600 with a single core 602A, a system agent 610, a set of one or more bus controller units 616, while the optional addition of the dashed lined boxes illustrates an alternative processor 600 with multiple cores 602A-N, a set of one or more integrated memory controller unit(s) in the system agent unit 610, and a special purpose logic 608, which may perform one or more specific functions.

Thus, different implementations of the processor 600 may include: 1) a CPU with a special purpose logic being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (throughput); and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache units 604A-N within the cores, a set or one or more shared cache units 606, and external memory (not shown) coupled to the set of integrated memory controller units 614.

The set of shared cache units 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the special purpose 608, the set of shared cache units 606, and the system agent unit 610/integrated memory controller unit(s) 614, alternative embodiments may use any number of well-known techniques for interconnecting such units.

The system agent unit 610 includes those components coordinating and operating cores 602A-N. The system agent unit 610 may include for example a power control unit (PCU) and a display unit. The PCU may be or include logic and components needed for regulating the power state of the cores 602A-N and the special purpose logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set. The cores 602A-N may include decoupled page prefetch circuitry as described herein.

Figure 7:
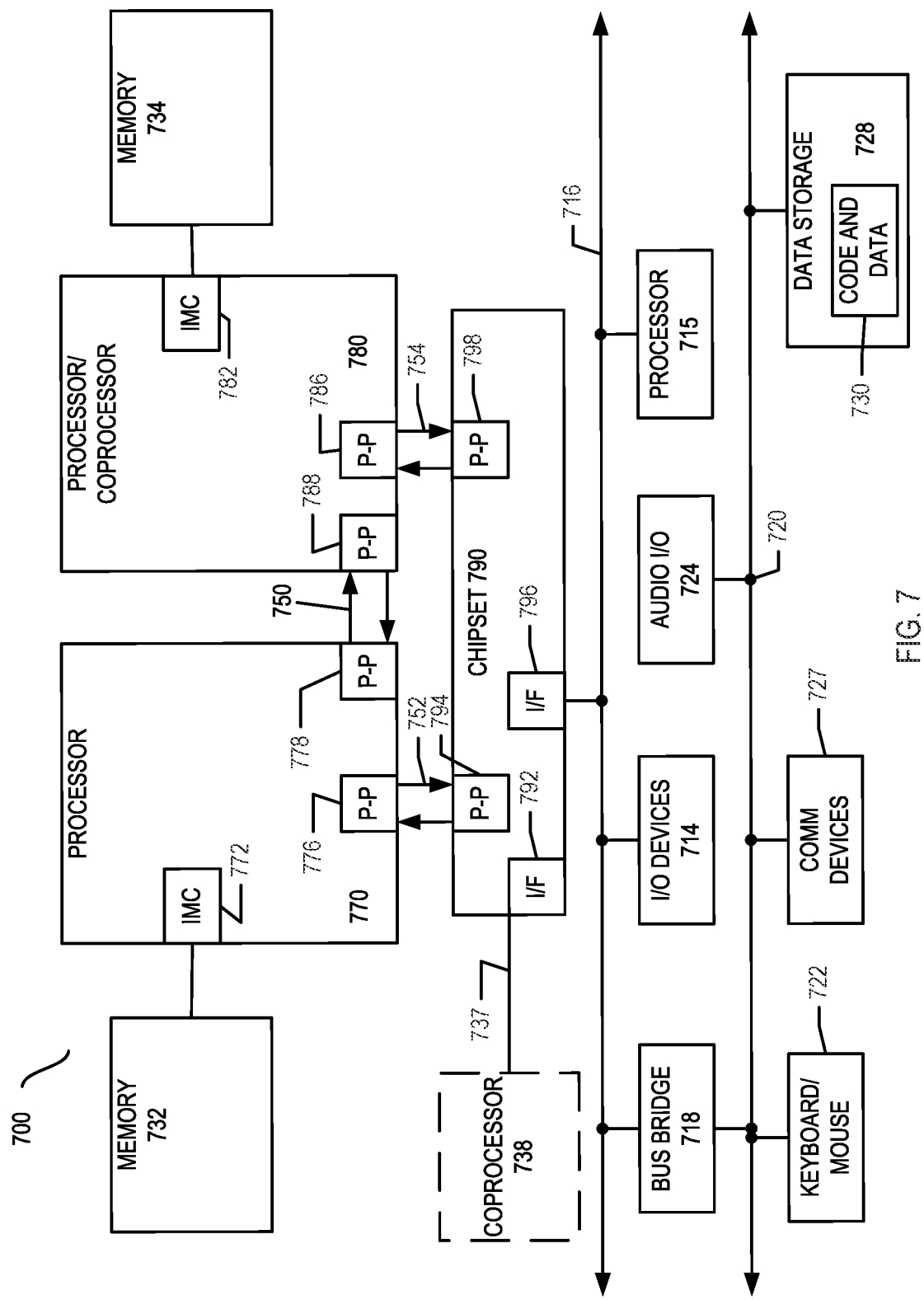
FIG. 7 is a block diagram of a first more specific exemplary system in accordance with an embodiment of the present invention.
Figure 8:
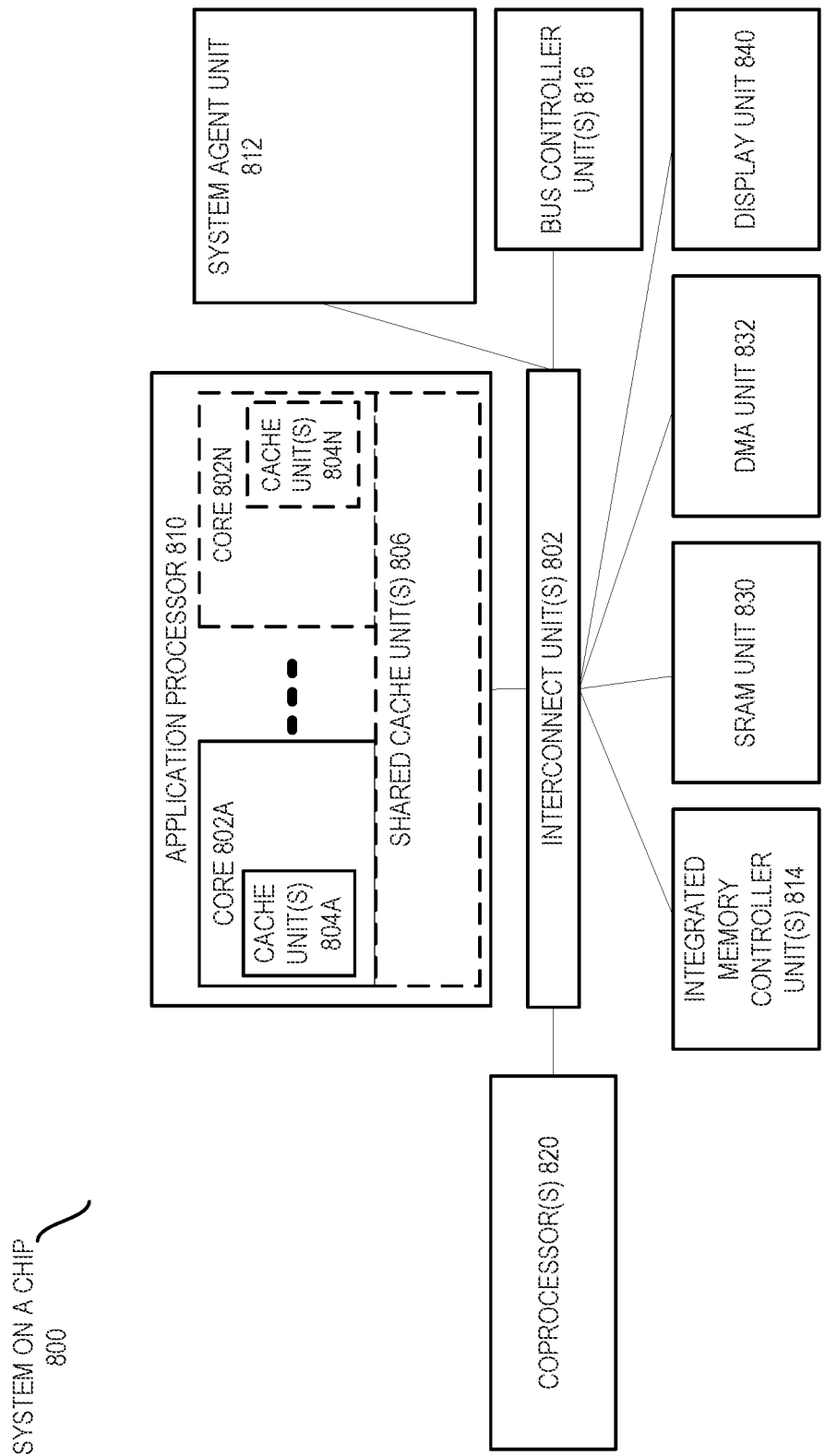
FIG. 8 is a block diagram of a SoC in accordance with an embodiment of the present invention.

FIGS. 7-8 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 7, shown is a block diagram of a first more specific exemplary system 700 in accordance with an embodiment of the present invention. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 600.

Processors 770 and 780 are shown including integrated memory controller (IMC) units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, integrated memory controllers (IMCs) 772 and 782 couple the processors to respective memories, namely a memory 732 and a memory 734, which may be portions of main memory locally attached to the respective processors. In embodiments processors 770, 780 may include page prefetch circuitry that is separate and decoupled from other prefetch circuitry as described herein.

Processors 770, 780 may each exchange information with a chipset 790 via individual P-P interfaces 752, 754 using point to point interface circuits 776, 794, 786, 798. Chipset 790 may optionally exchange information with the coprocessor 738 via a high-performance interface 739. In one embodiment, the coprocessor 738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via a P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, one or more additional processor(s) 715, such as coprocessors, high-throughput MIC processors, GPGPU's, accelerators (such as, e.g., graphics accelerators or digital signal processing (DSP) units), field programmable gate arrays, or any other processor, are coupled to first bus 716. In one embodiment, second bus 720 may be a low pin count (LPC) bus. Various devices may be coupled to a second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to the second bus 720. Note that other architectures are possible. For example, instead of the point-to-point architecture of FIG. 7, a system may implement a multi-drop bus or other such architecture.

Referring now to FIG. 8, shown is a block diagram of a SoC 800 in accordance with an embodiment of the present invention. Dashed lined boxes are optional features on more advanced SoCs. In FIG. 8, an interconnect unit(s) 802 is coupled to: an application processor 810 which includes a set of one or more cores 802A-N (including constituent cache units 804A-N) at least some of which may include page prefetch circuitry separate and decoupled from other prefetch circuitry as described herein; shared cache unit(s) 806; a system agent unit 812; a bus controller unit(s) 816; an integrated memory controller unit(s) 814; a set or one or more coprocessors 820 which may include integrated graphics logic, an image processor, an audio processor, and a video processor; a static random access memory (SRAM) unit 830; a direct memory access (DMA) unit 832; and a display unit 840 for coupling to one or more external displays. In one embodiment, the coprocessor(s) 820 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 730 illustrated in FIG. 7, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 9:
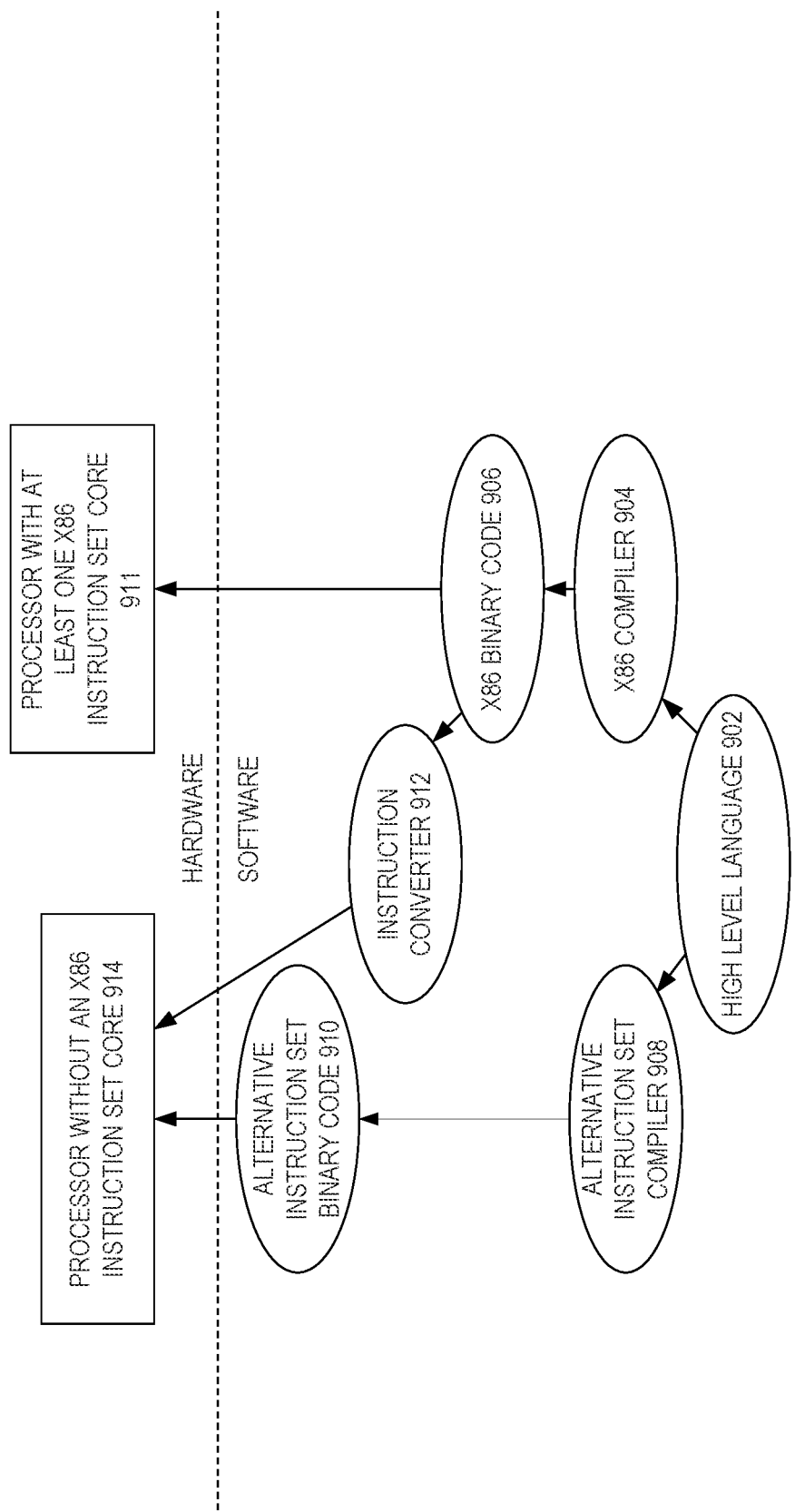
FIG. 9 is a block diagram contrasting the use of a software instruction converter to convert binary instructions in a source instruction set to binary instructions in a target instruction set according to embodiments of the invention.

FIG. 9 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 9 shows a program in a high level language 902 may be compiled using an x86 compiler 904 to generate x86 binary code 906 that may be natively executed by a processor with at least one x86 instruction set core 916. The processor with at least one x86 instruction set core 916 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 904 represents a compiler that is operable to generate x86 binary code 906 (e.g., object code) that can, with or without additional linkage processing, be executed on the processor with at least one x186 instruction set core 916. Similarly, FIG. 9 shows the program in the high level language 902 may be compiled using an alternative instruction set compiler 908 to generate alternative instruction set binary code 910 that may be natively executed by a processor without at least one x86 instruction set core 914 (e.g., a processor with cores that execute the MIPS instruction set of MIPS Technologies of Sunnyvale, CA and/or that execute the ARM instruction set of ARM Holdings of Sunnyvale, CA). The instruction converter 912 is used to convert the x86 binary code 906 into code that may be natively executed by the processor without an x86 instruction set core 914. This converted code is not likely to be the same as the alternative instruction set binary code 910 because an instruction converter capable of this is difficult to make; however, the converted code will accomplish the general operation and be made up of instructions from the alternative instruction set. Thus, the instruction converter 912 represents software, firmware, hardware, or a combination thereof that, through emulation, simulation or any other process, allows a processor or other electronic device that does not have an x86 instruction set processor or core to execute the x86 binary code 906.

The following examples pertain to further embodiments.

In one example, a processor includes: one or more execution circuits to execute instructions; a stream prediction circuit coupled to the one or more execution circuits, the stream prediction circuit to receive demand requests for information and, based at least in part on the demand requests, generate a page prefetch hint for a first page; and a prefetcher circuit to generate first prefetch requests each for a cache line, the stream prediction circuit decoupled from the prefetcher circuit.

In an example, the processor further comprises a shared cache memory coupled to the stream prediction circuit and the prefetcher circuit, where the shared cache memory is to receive second prefetch requests associated with the page prefetch hint and at least some of the first prefetch requests, where the second prefetch requests are for a different page than the first prefetch requests.

In an example, the processor further comprises a data cache unit comprising a first cache memory and the stream prediction circuit.

In an example, the processor further comprises a mid-level cache comprising a second cache memory and the prefetcher circuit, where the data cache unit is to send the page prefetch hint to the mid-level cache when the page prefetch hint misses in the first cache memory.

In an example, the processor further comprises an interconnect interface circuit to receive the second prefetch requests and the first prefetch requests and direct at least some of the second prefetch requests and at least some of the first prefetch requests to a shared cache memory.

In an example, the interconnect interface circuit is to send the second prefetch requests when the prefetcher circuit is stalled.

In an example, the processor further comprises a plurality of page detectors each to receive a page prefetch hint and to generate a plurality of prefetch requests based on the page prefetch hint.

In an example, a first page detector is to receive the page prefetch hint and to generate the plurality of prefetch requests for a first page based at least in part on a page stride value of the page prefetch hint.

In an example, the processor further comprises a throttler to throttle the stream prediction circuit based at least in part on a stress level.

In another example, a method comprises: receiving, in a second cache memory of a processor, a page prefetch hint from a first cache memory of the processor; allocating a page prefetch detector for the page prefetch hint; generating, in the page prefetch detector, a plurality of first prefetch requests based on the page prefetch hint; and sending the plurality of first prefetch requests to a shared cache memory of the processor in available slots of an interconnect coupled between the second cache memory and the shared cache memory.

In an example, the method further comprises arbitrating between the plurality of first prefetch requests and a plurality of second prefetch requests, the plurality of first prefetch requests for a first page located at a distance according to a page stride value from a second page to which the plurality of second prefetch requests are directed.

In an example, the method further comprises receiving the page prefetch hint comprising a page hint portion and offset hint portion, the page hint portion for two or more pages removed from a current demand access page.

In an example, the method further comprises: maintaining a count of consecutive cache line accesses for a second page; when the count meets a threshold level, generating the page prefetch hint in the first cache memory, the page prefetch hint for a first page that is at least two pages distance from the second page; and sending the page prefetch hint to the second cache memory.

In an example, the method further comprises resetting the count of consecutive cache lines in response to a non-consecutive cache line request.

In an example, the method further comprises updating the count of consecutive cache line accesses in response to a next consecutive cache line request.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, a system comprises a SoC and a system memory coupled to the SoC. The SoC may include: one or more execution circuits to execute instructions; a first cache memory coupled to the one or more execution circuits, the first cache memory comprising a stream prediction circuit to receive demand requests for information in a first page and, based at least in part on the demand requests, generate a page prefetch hint for a second page; and a second cache memory coupled to the first cache memory. The second cache memory may include: a first prefetch circuit to generate first prefetch requests; and a page prefetch circuit to generate second prefetch requests based on the page prefetch hint, where the page prefetch circuit is decoupled from the first prefetch circuit. The system memory may send first information from the first page to the SoC in response to the first prefetch requests and send second information from the second page to the SoC in response to the second prefetch requests.

In an example, the first prefetch circuit comprises a main band prefetch circuit.

In an example, the system further comprises an interface circuit coupled to the first prefetch circuit and the page prefetch circuit, where the interface circuit is to send a plurality of the second prefetch requests to a third cache memory when the first prefetch circuit is stalled.

In an example, the interface circuit is to handle the first prefetch requests with a higher priority than the second prefetch requests.

In an example, the page prefetch circuit is to generate the second prefetch requests for the second page, the second page removed from the first page having a triggering address for the page prefetch hint.

In an example, the interface circuit is to handle the first prefetch requests with a higher priority than the second prefetch requests.

In an example, the page prefetch circuit is to generate the second prefetch requests for the second page, the second page removed from the first page having a triggering address for the page prefetch hint.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
one or more execution circuits to execute instructions;
a stream prediction circuit coupled to the one or more execution circuits, the stream prediction circuit to receive demand requests for information and, based at least in part on the demand requests, generate a page prefetch hint for a first page; and
a prefetcher circuit to generate first prefetch requests each for a cache line, the stream prediction circuit decoupled from the prefetcher circuit.

2. The processor of claim 1, further comprising a shared cache memory coupled to the stream prediction circuit and the prefetcher circuit, wherein the shared cache memory is to receive second prefetch requests associated with the page prefetch hint and at least some of the first prefetch requests, wherein the second prefetch requests are for a different page than the first prefetch requests.

3. The processor of claim 1, further comprising a data cache unit comprising a first cache memory and the stream prediction circuit.

4. The processor of claim 3, further comprising a mid-level cache comprising a second cache memory and the prefetcher circuit, wherein the data cache unit is to send the page prefetch hint to the mid-level cache when the page prefetch hint misses in the first cache memory.

5. The processor of claim 2, further comprising an interconnect interface circuit to receive the second prefetch requests and the first prefetch requests and direct at least some of the second prefetch requests and at least some of the first prefetch requests to the shared cache memory.

6. The processor of claim 5, wherein the interconnect interface circuit is to send the second prefetch requests when the prefetcher circuit is stalled.

7. The processor of claim 1, further comprising a plurality of page detectors each to receive a page prefetch hint and to generate a plurality of prefetch requests based on the page prefetch hint.

8. The processor of claim 7, wherein a first page detector is to receive the page prefetch hint and to generate the plurality of prefetch requests for the first page based at least in part on a page stride value of the page prefetch hint.

9. The processor of claim 1, further comprising a throttler to throttle the stream prediction circuit based at least in part on a stress level.

10. A method comprising:
receiving, in a second cache memory of a processor, a page prefetch hint from a first cache memory of the processor;
allocating a page prefetch detector for the page prefetch hint;
generating, in the page prefetch detector, a plurality of first prefetch requests based on the page prefetch hint; and
sending the plurality of first prefetch requests to a shared cache memory of the processor in available slots of an interconnect coupled between the second cache memory and the shared cache memory.

11. The method of claim 10, further comprising arbitrating between the plurality of first prefetch requests and a plurality of second prefetch requests, the plurality of first prefetch requests for a first page located at a distance according to a page stride value from a second page to which the plurality of second prefetch requests are directed.

12. The method of claim 10, further comprising receiving the page prefetch hint comprising a page hint portion and offset hint portion, the page hint portion for two or more pages removed from a current demand access page.

13. The method of claim 10, further comprising:
maintaining a count of consecutive cache line accesses for a second page;
when the count meets a threshold level, generating the page prefetch hint in the first cache memory, the page prefetch hint for a first page that is at least two pages distance from the second page; and
sending the page prefetch hint to the second cache memory.

14. The method of claim 13, further comprising resetting the count of consecutive cache line accesses in response to a non-consecutive cache line request.

15. The method of claim 13, further comprising updating the count of consecutive cache line accesses in response to a next consecutive cache line request.

16. A system comprising:
a system on chip (SoC) comprising:
one or more execution circuits to execute instructions;
a first cache memory coupled to the one or more execution circuits, the first cache memory comprising a stream prediction circuit to receive demand requests for information in a first page and, based at least in part on the demand requests, generate a page prefetch hint for a second page; and
a second cache memory coupled to the first cache memory, the second cache memory comprising:
a first prefetch circuit to generate first prefetch requests; and
a page prefetch circuit to generate second prefetch requests based on the page prefetch hint, wherein the page prefetch circuit is decoupled from the first prefetch circuit; and
a system memory coupled to the SoC, wherein the system memory is to send first information from the first page to the SoC in response to the first prefetch requests and send second information from the second page to the SoC in response to the second prefetch requests.

17. The system of claim 16, wherein the first prefetch circuit comprises a main band prefetch circuit.

18. The system of claim 16, further comprising an interface circuit coupled to the first prefetch circuit and the page prefetch circuit, wherein the interface circuit is to send a plurality of the second prefetch requests to a third cache memory when the first prefetch circuit is stalled.

19. The system of claim 18, wherein the interface circuit is to handle the first prefetch requests with a higher priority than the second prefetch requests.

20. The system of claim 16, wherein the page prefetch circuit is to generate the second prefetch requests for the second page, the second page removed from the first page having a triggering address for the page prefetch hint.

* * * * *